United States Patent [19]
Lee

[11] Patent Number: 5,974,187
[45] Date of Patent: Oct. 26, 1999

[54] BASELINE-BASED CONTOUR CODING AND DECODING METHOD AND APPARATUS THEREFOR

[75] Inventor: Shi-hwa Lee, Seoul, Rep. of Korea

[73] Assignee: Samsung Electronics Co., Ltd., Suwon-city, Rep. of Korea

[21] Appl. No.: 08/967,324

[22] Filed: Oct. 21, 1997

[30] Foreign Application Priority Data

Oct. 21, 1996 [KR] Rep. of Korea ............. 96-47716

[51] Int. Cl.[6] .................................... G06K 9/48
[52] U.S. Cl. .................................... 382/242
[58] Field of Search .................... 382/242, 236, 382/243; 345/469

[56] References Cited

U.S. PATENT DOCUMENTS

5,459,828 10/1995 Zack et al. .................... 345/472
5,907,639 5/1999 Kim ................................ 382/242

*Primary Examiner*—Jose L. Couso
*Assistant Examiner*—Anh Hong Do
*Attorney, Agent, or Firm*—Burns, Doane, Swecker & Mathis, L.L.P.

[57] ABSTRACT

Baseline-based contour coding and decoding methods are provided. The coding method comprises the steps of determining a baseline of a still image or moving image object and a predetermined sampling interval, sampling the contour of the object according to the baseline and the sampling interval and extracting contour sample data, extracting utmost contour sample data of the object from the contour sample data, and calculating a difference between the utmost contour sample data and the contour sample data and extracting error sample data. Using a characteristics of contour data having a gentle change, the still image contour coding using transformation or the moving image contour coding using transformation and motion estimation guarantees excellent reconstruction even with a small amount of generated bit.

15 Claims, 9 Drawing Sheets

TURNING POINT

FIG. 12D

TURNING POINT

BASELINE-BASED CONTOUR CODING AND DECODING METHOD AND APPARATUS THEREFOR

BACKGROUND OF THE INVENTION

1. Field of the Invention

The present invention relates to a still image or moving image coding and decoding method, and more particularly, to a baseline-based contour coding and decoding method.

2. Description of Related Art

In a method of coding a still or moving image in object units, a contour coding with respect to an object plays an important role. In particular, in a low-transmission rate coding such as MPEG4, a burden followed by the coding of contour must be reduced as much as possible. For this, the contour must be highly compressed while being reconstructed similar to the original contour. Also, most contours has continuity, so it can be comprised of slowly-changing one-dimensional data. Therefore, the contours can be effectively utilized for the coding using transformation.

A general contour coding method is a chain coding method being widely used in a computer vision. In the chain coding method, a code with respect to each direction is previously defined, and a contour is coded using the predefined codes with respect to tracking directions while tracking the contour in a consistent direction. According to this chain coding method, information on the contour is completely preserved, so that the contour can be reproduced similarly to the original contour. However, a great amount of bit is generated due to the coding, and it is difficult to consider time redundancy in a sequence signal such as video.

An image processing field has a lot of application fields which do not require an extremely accurate contour reconstruction. In these application fields, the chain coding method generating many bits is not appropriate, so other methods, which generates a small amount of bit even though information on the contour is not completely reconstructed, are required. One method among them is a polygonal approximation method which approximates an entire contour associated with one object using a polygon. This polygonal approximation method is greatly effective in respect of bit generation, but deteriorated in reconstruction.

To overcome this defect, a spline approximation method has been proposed. The traditional polygonal approximation method approximates a contour to a straight line, while the spline approximation method approximates the contour to a curved line. Accordingly, a higher reconstruction can be accomplished due to the identical amount of bit.

Meanwhile, a discrete sine transformation (DST) instead of the spline method has been proposed. In this method, a contour is first approximated by the polygonal approximation method, one straight line of a polygon is sampled in a predetermined number, and then a sampling error value of a difference between the polygon and the contour is discrete-sine-transformed and quantized, thereby completing the coding process. According to this method, a complicate contour can be more accurately reconstructed even by a smaller amount of bit.

However, the several aforementioned contour coding methods are all methods for performing contour coding in still images. Each object in a moving image usually has a similar shape and a similar position within adjacent time, so that the contours of the respective objects also have time redundancy. Thus, efficiency of coding can be enhanced by coding the contour of a moving image using time redundancy.

According to an example of a method for coding the contour of a moving image, the motion of objects of a k-th frame is estimated depending on objects of a (k−1)th frame and then compensated, so that a contour to be coded is extracted from an unoverlapped portion between the k-th and (k−1)th objects and the extracted contour is coded by the chain coding method. However, in this method, a contour is coded to a lot of short-length lines when the contour of a moving object is complicated, which results in a frequent coding of a start point coordinate of the contour. Thus, the moving image contour coding method is inefficient.

SUMMARY OF THE INVENTION

To solve the above problem, an object of the present invention is to provide a contour coding method for sampling a contour using a baseline of an object and an apparatus therefor.

Another object of the present invention is to provide a contour decoding method for decoding data of the contour sampled by the contour coding method.

To accomplish the first object, there is provided a baseline-based contour coding method comprising the steps of: determining a baseline of a still image or moving image object and a predetermined sampling interval; sampling the contour of the object according to the baseline and the sampling interval and extracting contour sample data; extracting utmost contour sample data of the object from the contour sample data; and calculating a difference between the utmost contour sample data and the contour sample data and extracting error sample data.

To accomplish the first object, there is provided another baseline-based contour coding method comprising the steps of: deciding a baseline of a still or moving image object and a predetermined sampling interval; deciding the position of a sample far-most away from the baseline as a first sample point, deciding sample points according to the priority order having considered a traveling direction, and sampling the contour of the object at the sampling interval; determining whether the point to be sampled in the sampling step corresponds to a turning point in the shape of the object; sampling a coordinate value corresponding to the turning point twice, and extracting position data of the turning point, when the sampled point is a turning point in the turning point determining step; and extracting data of a distance between the baseline and the corresponding sampled point, when the sampled point is not a turning point in the turning point determining step.

To accomplish the first object, there is provided a baseline-based contour encoder comprising: a contour sampler for baseline-based sampling contour data from a still or moving image object, and extracting utmost contour sample data and error sample data of the object; a motion estimator for dividing the contour sample data into predetermined-sized blocks and estimating motions with reference to previous contour data with respect to each block; a coder for quantizing difference data obtained from sample data from the contour sampler and motion-compensated data, and coding the quantized data; and a contour reconstructor for producing previous contour data by de-quantizing the quantized data and compensating motions according to previous contour data and motion values.

To accomplish the first object, there is provided another baseline-based contour encoder comprising: a contour sampler for baseline-based sampling contour data from a still or moving image object, and extracting position data or distance data according to whether sample data corresponds to a turning point or not; a motion estimator for dividing the contour sample data into predetermined-sized blocks and estimating motions with reference to previous contour data with respect to each block; a coder for quantizing difference data obtained from sample data from the contour sampler and motion-compensated data, and coding the quantized data; and a contour reconstructor for producing previous contour data by de-quantizing the quantized data and compensating motions according to previous contour data and motion values.

To accomplish the second object, there is provided a baseline-based contour decoding method comprising the steps of: receiving the encoded data and reconstructing utmost contour sample data and error sample data from the received data; subtracting the error sample data from the utmost contour sample data and reproducing reconstructed sample data including a quantization error; and decoding the reconstructed data using motion compensation and transformation.

To accomplish the second object, there is provided a baseline-based contour decoding method comprising the steps of: receiving the encoded data and decoding distance data and turning point data from the received data; determining whether sample data corresponds to a turning point; changing the direction of reconstructing in opposition and reconstructing a contour according to the turning point data when it is determined in the determining step that the sample data is a turning point, otherwise, reconstructing a contour according to the distance data; and decoding the reconstructed data using motion compensation and transformation.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
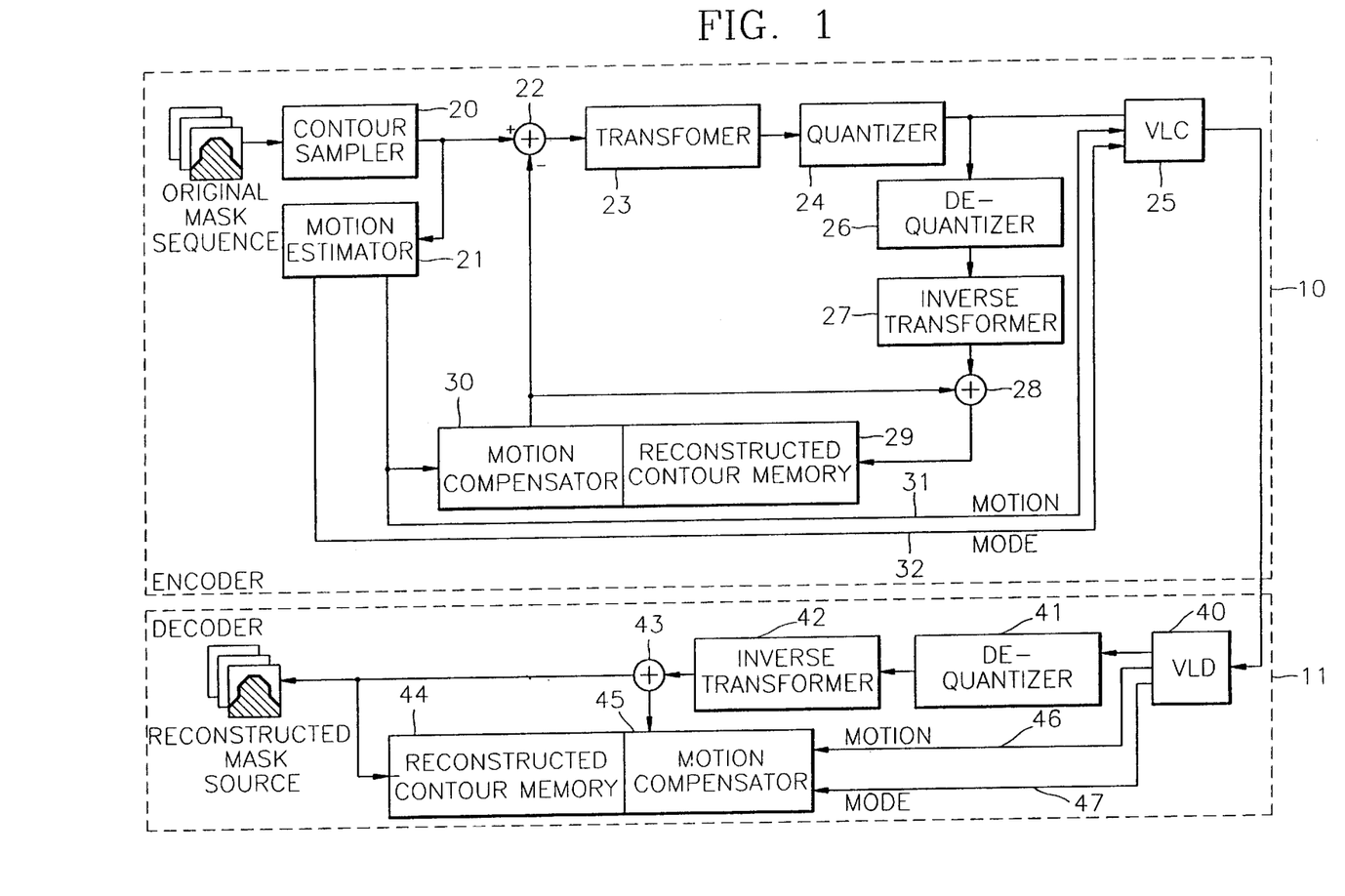
FIG. 1 is a block diagram of a contour encoder and a contour decoder according to the present invention.

Referring to FIG. 1, a contour encoder 10 includes a contour sampler 20, a motion estimator 21, a subtractor 22, a transformer 23, a quantizer 24, a variable length coder (VLC) 25, a de-quantizer 26, an inverse transformer 27, an adder 28, a reconstructed contour memory 29 and a motion compensator 30. A contour decoder 11 includes a variable length decoder (VLD) 40, a de-quantizer 41, an inverse transformer 42, an adder 43, a reconstructed contour memory 44 and a motion compensator 45.

First, in the contour encoder 10, the contour sampler 20 samples data of a contour based on a baseline from a mask image. The motion estimator 21 divides the data produced by the contour sampler 20 into blocks of predetermined sizes, and estimates the motions with respect to the respective blocks with reference to previous contour data stored in the reconstructed contour memory 29. The motion compensator 30 produces motion-compensated data with reference to the previous contour data and according to the motion values estimated by the motion estimator 21. The subtractor 22 subtracts the motion-compensated data produced by the motion compensator 30 from the original data produced by the contour sampler 20. The transformer 23 and the quantizer 24 perform transformation and quantization using the difference data calculated by the subtractor 22. The VCL 25 receives the quantized data provided by the quantizer 24, codes the same and transmits the result to the contour decoder 11. Also, the data quantized by the quantizer 24 is sequentially de-quantized and inversely-transformed by the de-quantizer 26 and the inverse transformer 27. The adder 28 produces previous contour data by adding the de-quantized and inversely-transformed data to the data produced by the motion compensator 30. The previous contour data is stored in the reconstructed contour memory 29, and is referred when the motion of data coming later is estimated and compensated. The VLC 25 encodes a processing mode 32 and a motion information 31 generated in the encoding process in addition to the quantized data provided by the quantizer 24, and transmits the encoded data to the contour decoder 11.

The contour decoder 11 receives the encoded data transmitted from the encoder 10 and reproduces a contour image. The VLD 40 translates the data transmitted from the VLC 25 and classifies as quantization information, a process mode and motion information. The de-quantizer 41 and the inverse transformer 42 de-quantizes and inversely-transforms the quantization information. The motion compensator 45 compensates motions with reference to the previous contour data stored in the reconstructed contour memory 44 and according to the process mode and the motion information. The adder 43 forms a contour image by adding the data output from the inverse transformer 42 to the data output from the motion compensator 45. The contour image data is stored in the reconstructed contour memory 44 and used as reference data for compensating motions of data coming later.

Figure 2:
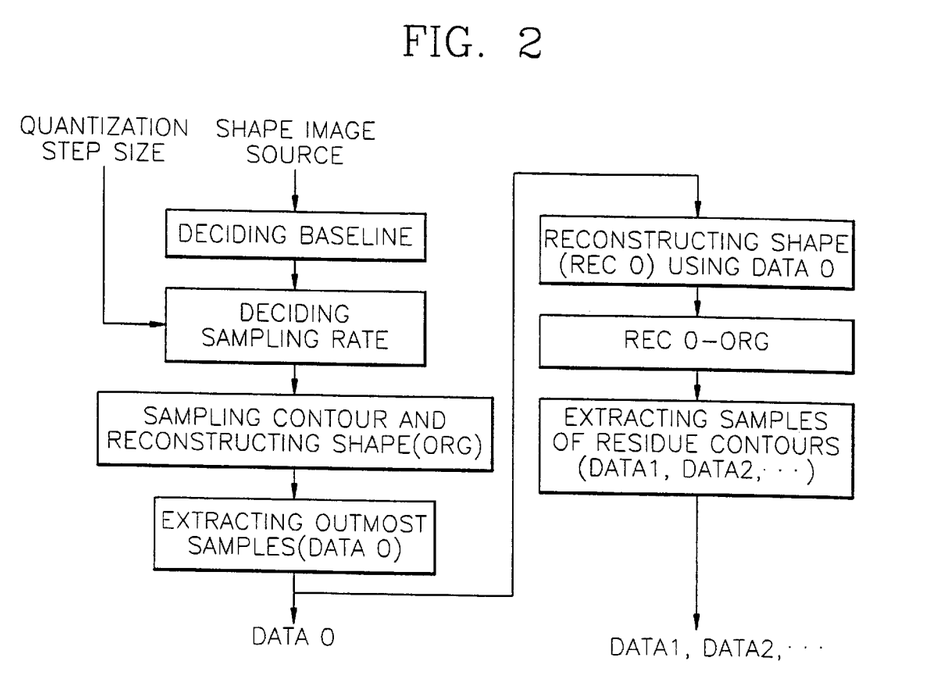
FIG. 2 is a flowchart for outlining a contour sampling method according to a first embodiment of a contour sampler shown in FIG. 1.

FIG. 2 is a flowchart for outlining a sampling method according to a first embodiment of the contour sampler 20 shown in FIG. 1. The contour sampling method according to the present invention is a baseline-based contour coding method, wherein a distance between a center point and a contour is measured and the contour of an object is encoded by discrete-cosine-transforming the measured distance.

Figure 3:
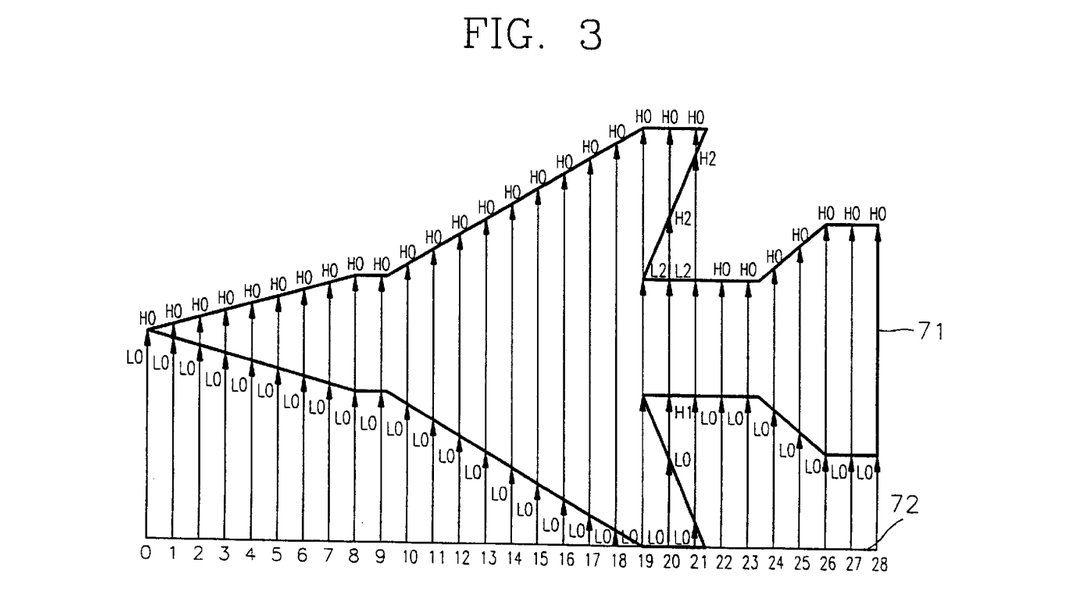
FIG. 3 shows the contour and the baseline of an object.

In step 60, a baseline for contour sampling is selected. A longer line of vertical and horizontal lines produced by projecting an object to vertical and horizontal axes is set as the baseline. In FIG. 3, reference numeral 71 denotes an object, and reference numeral 72 denotes a baseline.

In step 61, a sampling rate is decided, and a sampling interval is determined by the size of a predetermined quantization step. That is, since a maximum error generated in the quantization process is half the quantization step, the sampling interval is set to be half the quantization step. Whereby, a quantization error value with respect to vertical data can be the same as a maximum value of a sampling error on a horizontal axis.

Figure 4:
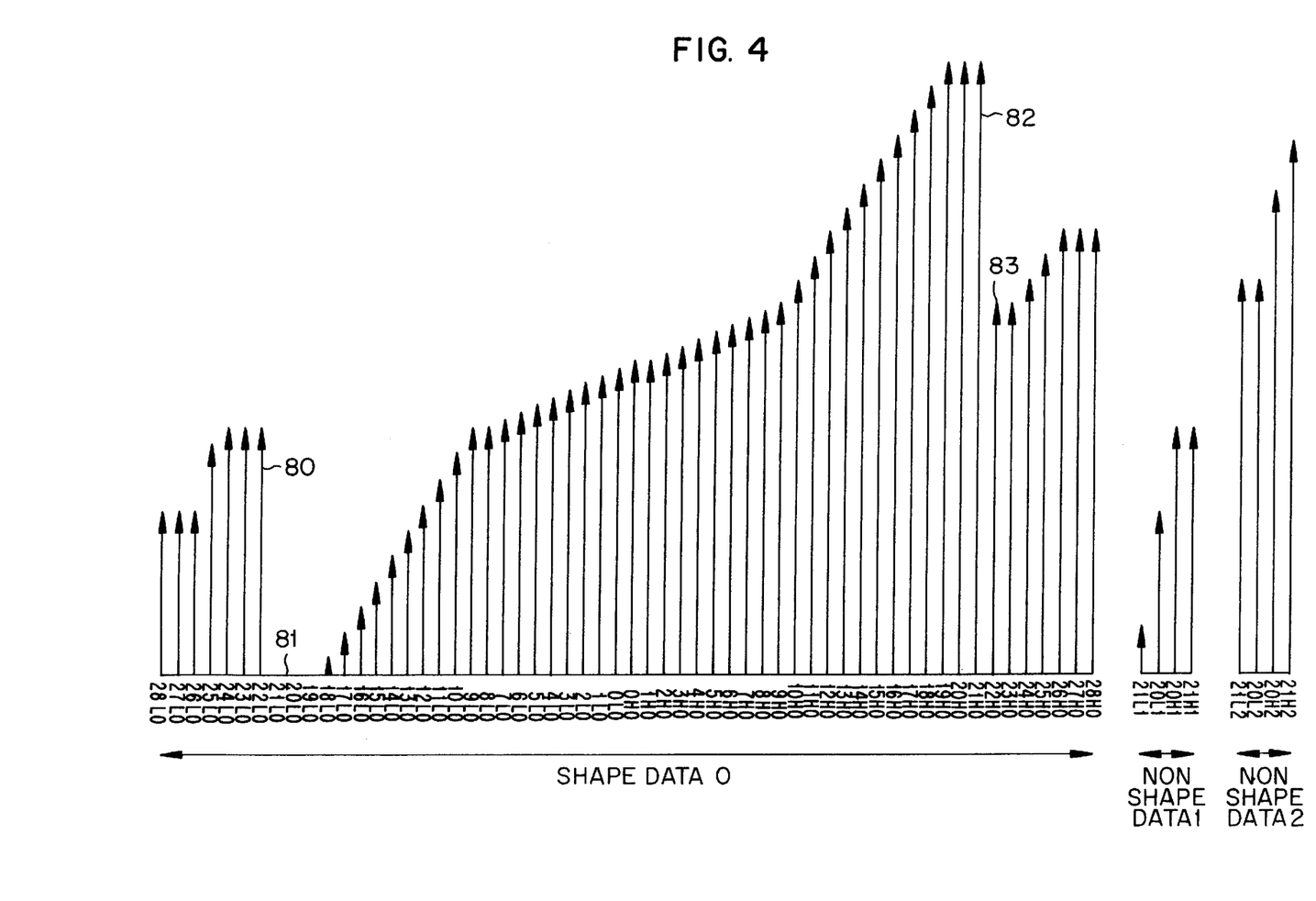
FIG. 4 shows data of the contour extracted by the method of FIG. 2.

In step 62, the contour of an object is sampled depending on the baseline and the sampling interval. FIG. 4 shows the baseline 72 and the contour samples sampled at predetermined intervals. That is, an utmost contour sample (nL, nH; here, n is a sample number) and error samples (pLq, pHq; here, p is a sample number and q is an error number) are constructed corresponding to one point of the baseline. In order to extract the contour points of the object, sampling points 0 to 28 are selected at an identical interval on the baseline. A grid is formed from the selected sampling points to the object, and the intersecting points between the object contour and the grid are determined as sampled contour points. Here, when the contour points are arranged, points (points indicated by LO in FIG. 3) close to the baseline among the sampled contour points are arrayed starting from one end of the baseline toward the other thereof, and points (points indicated by HI in FIG. 3) far from the baseline are arrayed in the opposite direction of the above arrangement order.

Figure 5:
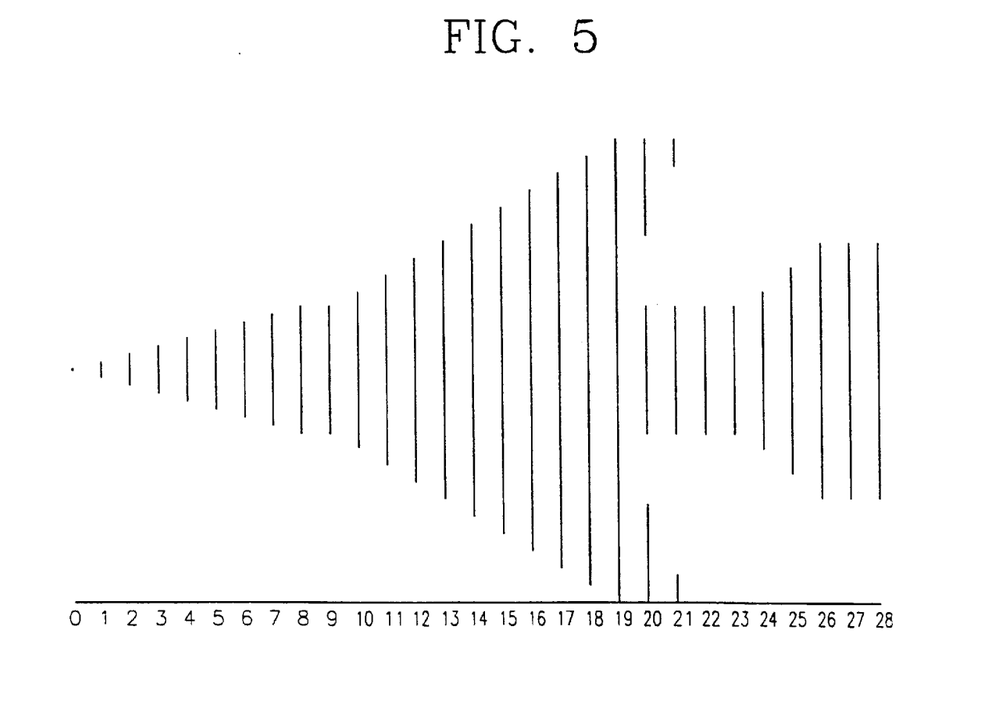
FIG. 5 shows the shape (ORG) of an object reconstructed from the contour sample data shown in FIG. 4.

The shape data 0 in FIG. 4 is obtained by extracting the contour data of the object 71 shown in FIG. 3 using the above method. After the shape data 0 is extracted as described above, nonextracted remaining contour points (points indicated by L1, L2, H1 and H2 in FIG. 3) are extracted in the same manner, wherein the extracted data are represented as nonshape data 1 and 2 in FIG. 4. FIG. 5 shows the shape (ORG) of an object reconstructed from the contour sampling data shown in FIG. 4.

In step 63, utmost contour samples are extracted from the sample data obtained in step 62, and utmost contour sample data are thus produced. The shape data 0 in FIG. 4 denotes the utmost contour sample data.

In an encoding method using transformation, data whose values slowly change between themselves can be effectively encoded. Accordingly, when two-dimensional data is transformed into one-dimensional data, it is effective to array the two-dimensional data to reduce a difference between H-row and L-row values. Therefore, the array initially made from 28L to 0L and then from 0H to 28H like the shape data 0 in FIG. 4 is more preferable than an array, i.e., 0L to 28L and 28H to 0H. In other words, a difference value between upper and lower contours 0H and 0L, sampled at the left-most from the object, among the contour sample data is compared with that between upper and lower contours 28H and 28L, sampled at the right-most from the object, among the contour sample data. Then, the utmost contour data is arranged from the side having a larger difference value. At this time, if the data array starting from the sample point 0 is made clockwise from the 0H, and if the data array starting from the sample point 28 is made counter-clockwise from the 28L, a special bit indicating the array method does not need to be used. It is undoubtedly possible that the samples are arrayed in exact opposition to the above-described direction. Then, the contour decoder 11 should control the data to be arranged in the corresponding direction. The shape data 0 produced in step 63 is divided into several blocks of predetermined size, and encoded by the device shown in FIG. 1.

Figure 6:
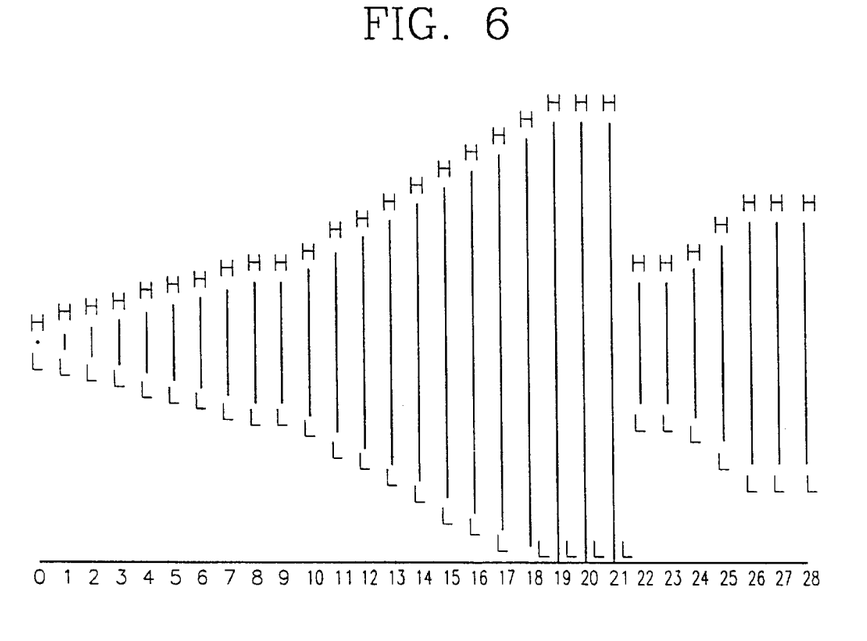
FIG. 6 shows the utmost contour shape (REC0) of an object produced by the shape data (data0) shown in FIG. 4.
Figure 7:
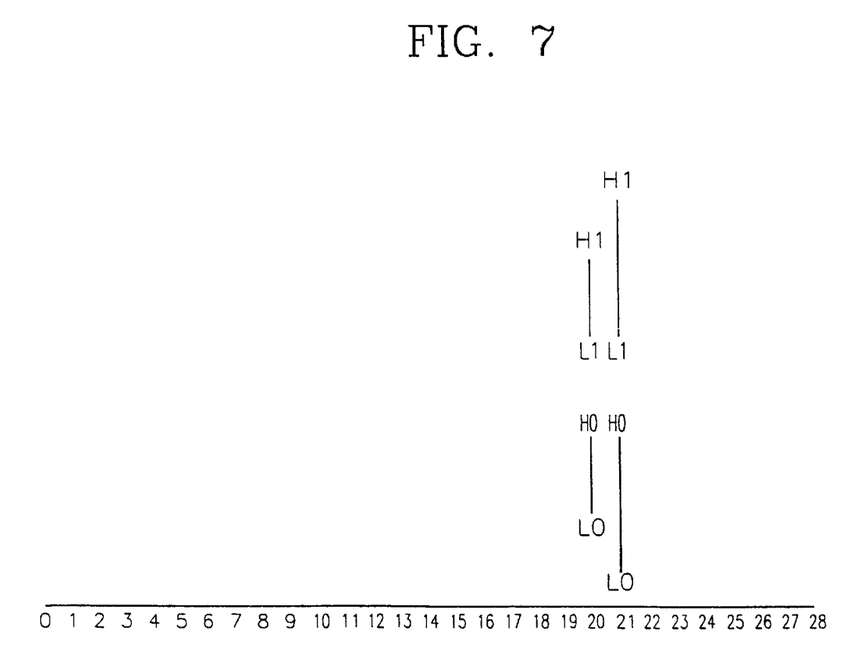
FIG. 7 shows error sample data (data 1 and data 2)

The method of extracting error sample data will now be described. In step 64, utmost contour data of an object are reconstructed using the utmost contour sample data produced in step 63. FIG. 6 shows the utmost contour shape data (REC0) reconstructed using the shape data 0 of FIG. 4. In step 65, the data (ORG) produced in step 62 are subtracted from the utmost contour data (REC0) produced in step 64. In step 66, error samples are arrayed depending on a result obtained in step 65. FIG. 7 shows an array of error sample data. The arrayed error data is divided into blocks of predetermined sizes, and encoded by the device shown in FIG. 1.

Meanwhile, the contour decoder 11 shown in FIG. 1 reconstructs data in opposition to the sampling method of FIG. 2. First, data such as FIG. 6 is produced from reproduced utmost contour sample data. Then, data such as FIG. 7 are produced from reconstructed error sample data. The data of FIG. 7 is subtracted from the data of FIG. 6, whereby reconstructed data including the original sample data and also a quantization error can be reproduced. Finally, the contour of the object is reconstructed using the reproduced sample data.

In the motion estimation, position displacement having the smallest difference value within a predetermined range from the present position is used as motion information with reference to utmost contour data previously reproduced in predetermined-sized block units, in the case of the utmost contour data. In error data case, the most similar error data among the previously-reproduced error data is selected, and position displacement having the smallest difference value within a predetermined range among the selected data is used as the motion information. Thus, in the error data case, referred previous error data numbers are also used as the motion information. In the error data case, if some sample data cannot be partially referred due to a difference in the number of data, the motion information is obtained from data at both ends among the previously-reproduced error data. The motion compensation determines a reference image using a method such as the motion estimation.

Figure 8:
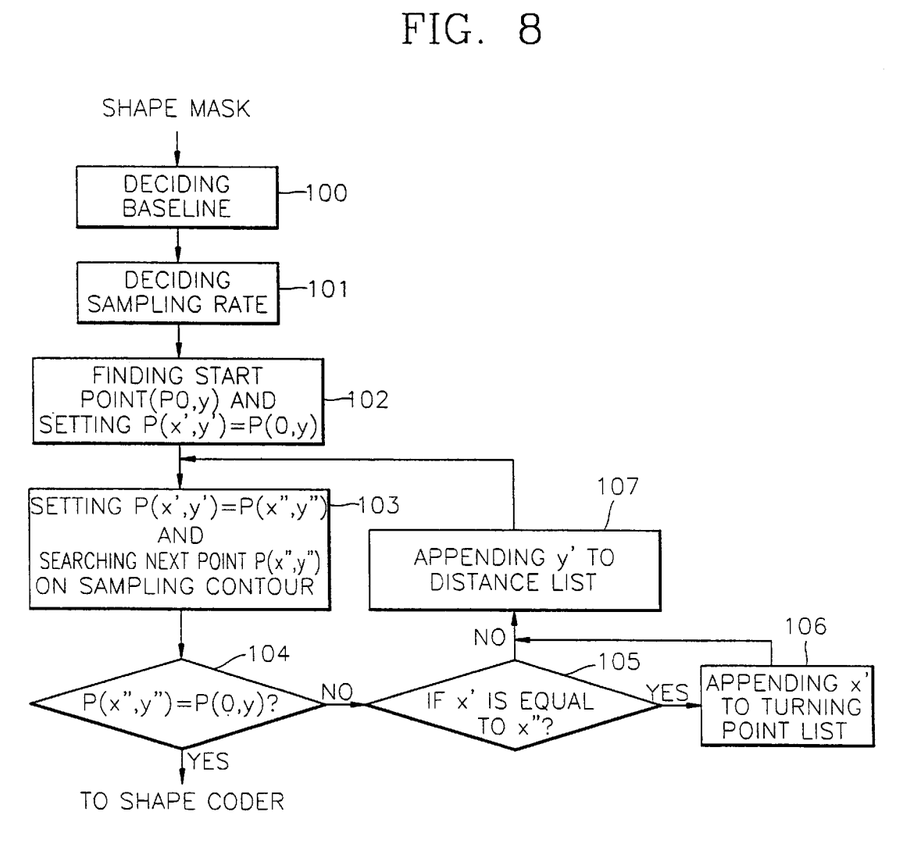
FIG. 8 is a flowchart for outlining a sampling method according to a second embodiment of the contour sampler shown in FIG. 1.

FIG. 8 is a flowchart for outlining a sampling method according to a second embodiment of the contour sampler 20 shown in FIG. 1. There is a case when a sample data value is abruptly changed if contour data is extracted by the method of FIG. 2. For instance, the contour points 80 and 81 and 82 and 83 in FIG. 4 correspond to the above case. Such a discontinuity appears as the non-shape data 1 and 2 are separated. This discontinuity deteriorates a compression effect of data. Thus, a method for improving such a discontinuity will now be described.

In step 100, a baseline with respect to an input shape mask is selected. A longer axis among vertical and horizontal axes is determined as the baseline. In step 101, accuracy of a sampled contour is controlled by determining a sampling rate. At this time, when a sampling interval is wide, the number of data to be generated decreases, but the quality of the reproduced contour is degraded. When the sampling interval is narrow, the number thereof increases, but the quality thereof is enhanced.

Figure 9:
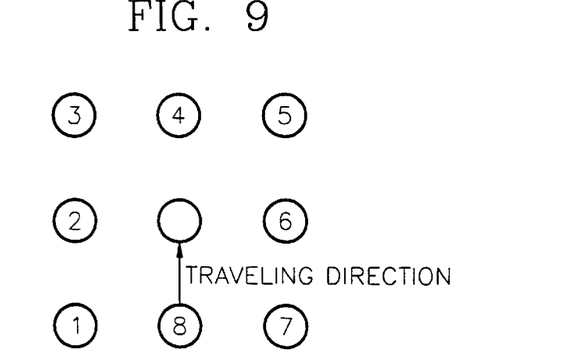
FIG. 9 explains the priority order for searching a next sampling point considering the traveling directionality.
Figure 10:
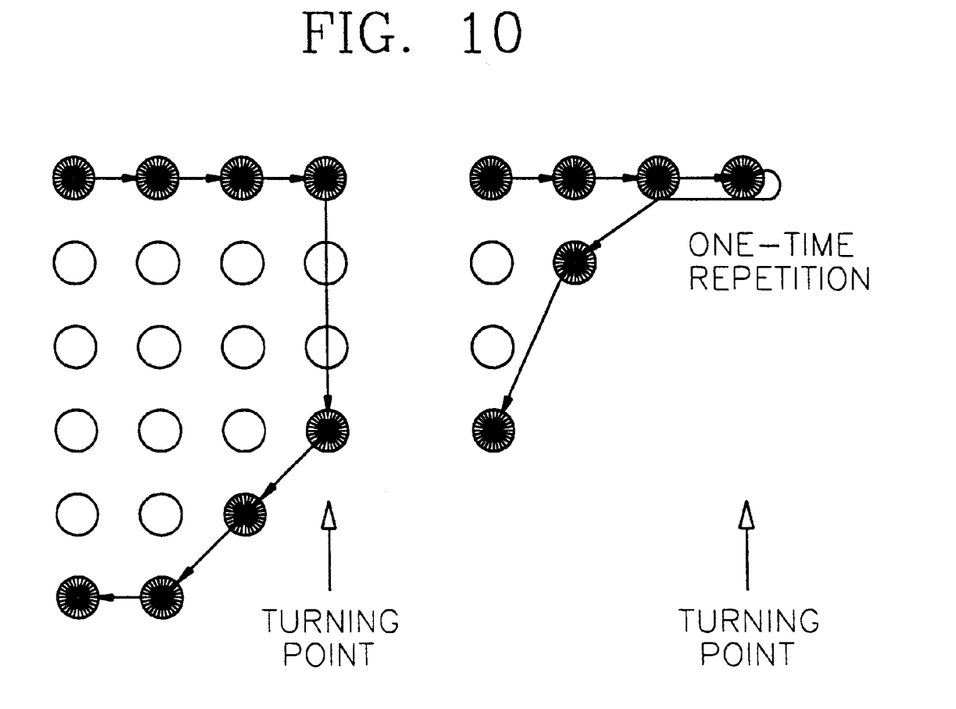
FIG. 10 explains a turning point.

In step 102, data to be extracted at the first, i.e., a start point P(0,y) is searched, and a sample having the largest distance among sampling data is selected as the start point. In step 103, the next sampling point P(x'',y'') is searched at the present sampling point considering a traveling direction. As shown in FIG. 9, the connectivity between 8 samples placed in all directions is considered, sample points placed at locations determined according to the priority order having considered the traveling direction are investigated, and whether non-processed sample points exist or not is checked, thereby selecting the next sample point. In step 104, a determination of whether all sample points were processed or not is made. That is, when the next sample point returns to the start point, i.e., when P(x",y") equals P(0,y), the sampling process is finished. In step 105, the x coordinate (x') of a previous sample point is compared with the x coordinate (x") of a present sample point, and a determination of whether the present sample point is a turning point or not is made. If the former is equal to the latter, the present sample point is to be the turning point. In the turning point, a coordinate value on the baseline repeats twice. Meanwhile, when the turning point is comprised of one sample point, the sample point is repeated once more. FIG. 10 is a view for explaining the turning point.

In step 106, if it is determined in step 105 that the present sample point is the turning point, the position value of the turning point is extracted and added to a turning point list. In step 107, if it is determined in step 105 that the present sampling point is not the turning point, a distance between the baseline and the present sample point is extracted and added to a distance list.

Figure 11:
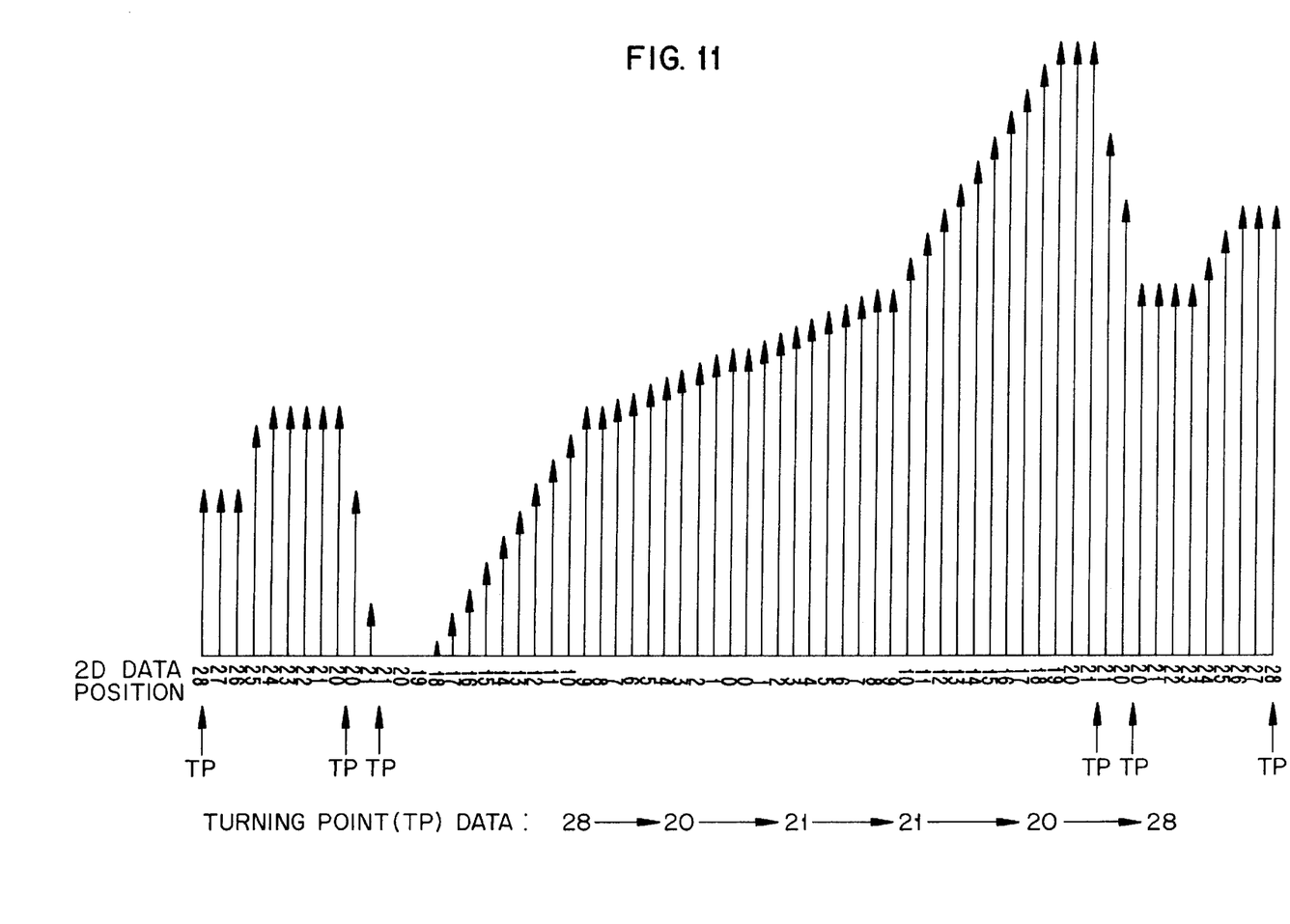
FIG. 11 shows data of a contour extracted by the method of FIG. 8.
Figure 12A:
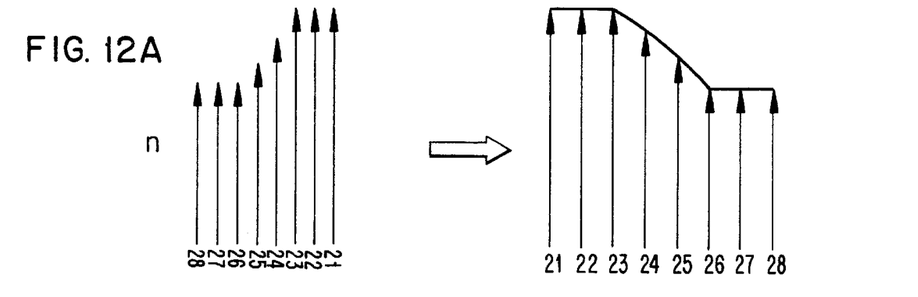
FIG. 12 is a view for explaining a method of decoding data encoded by the method of FIG. 8.
Figure 12B:
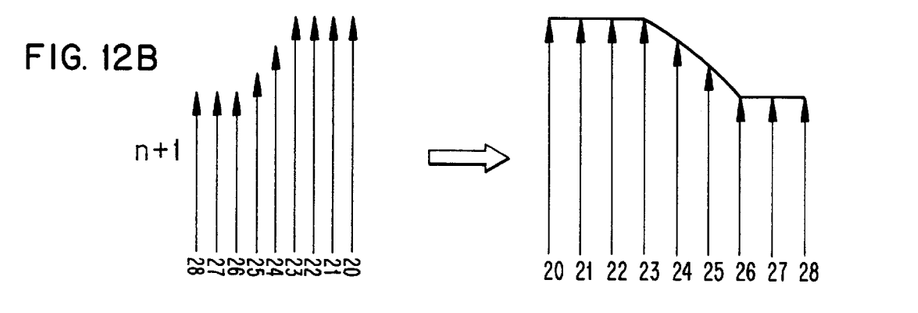
Figure 12C:
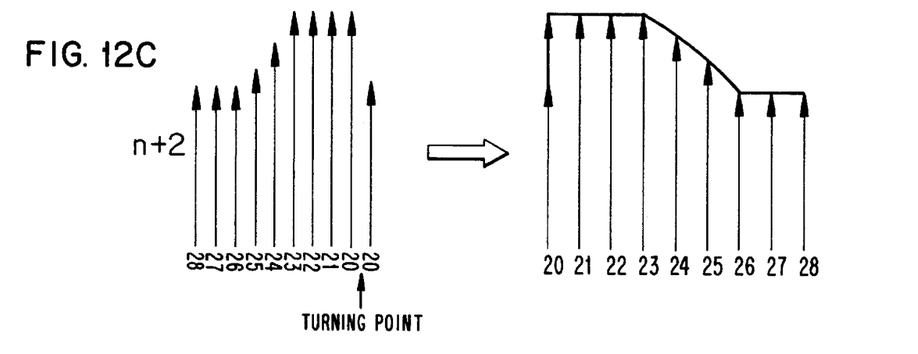
Figure 12D:
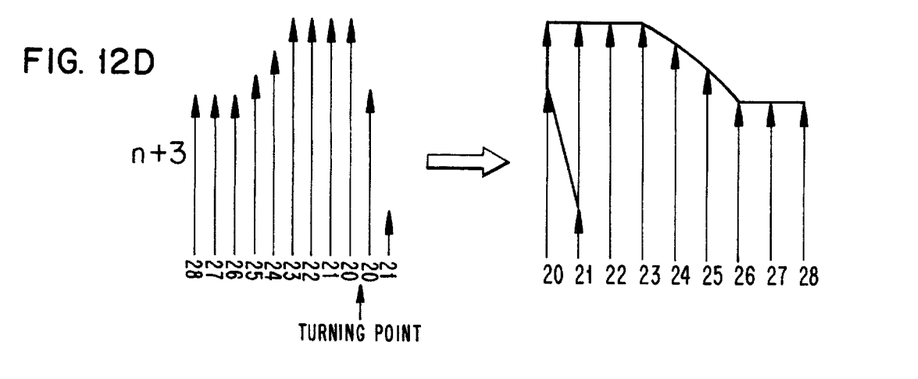

Though such a process, finally, the turning point positions and distance data are extracted and processed by the encoder shown in FIG. 1. FIG. 11 is an example of contour data extracted from the object shown in FIG. 3 through the process of FIG. 8. The contour sample data extracted by the process of FIG. 8 can be effectively encoded using differential pulse code modulation (DPCM) or discrete-cosine-transformation (DCT). That is, the contour sample data has excellent continuity therebetween, so that the compression effect of data is improved if using DPCM or DCT method.

FIG. 12 is a view for outlining a encoded data using the encoded data using the distance data and turning point data extracted by the process of FIG. 8. The encoded n-th data 21 data is decoded as (a), and the encoded (n+1)th data 20 data is decoded as (b). Here, since there is information that the data 20 corresponds to a turning point, the direction of decoding is changed. Also, since the next sample data must be decoded at the turning point, it is decoded as (c) in a (n+2)th data case. In (n+3)th data, input samples are decoded according to the already-changed direction of decoding. According to this method, all data can be decoded. The baseline-based contour coding and decoding methods according to the present invention is applicable to a still image contour as well as a moving image contour.

As described above, the baseline-based contour coding and/or decoding method(s) according to the present invention adopts a contour sampling method which equalizes importance degrees with respect to the samples sampled from an object. Thus, data redundancy of the center point-based contour coding method can be prevented.

Also, using a characteristics of contour data having a gentle change, the still image contour coding using transformation or the moving image contour coding using transformation and motion estimation guarantees excellent reconstruction even with a small amount of generated bit.

Particularly, in the moving image coding process, since a contour is likely to be slowly changed, motion estimation and compensation for one-dimensional sampled data can be effectively accomplished using the contour sampling method according to the present invention. Furthermore, since extracted contour samples maintain a continuity therebetween, they can be effectively coded by DPCM or DCT.

What is claimed is:

1. A baseline-based contour coding method comprising the steps of:

determining a baseline of a still image or moving image object and a predetermined sampling interval;

sampling the contour of the object according to said baseline and said sampling interval and extracting contour sample data;

extracting utmost contour sample data of the object from said contour sample data; and calculating a difference between said utmost contour sample data and said contour sample data and extracting error sample data.

2. The baseline-based contour coding method as claimed in claim 1, wherein a longer line of vertical and horizontal lines produced by projecting the object to vertical and horizontal axes is set as said baseline.

3. The baseline-based contour coding method as claimed in claim 1, wherein said sampling interval is determined by the size of a quantization step.

4. The baseline-based contour coding method as claimed in claim 1, wherein said sampling interval is set to half the size of said quantization step.

5. The baseline-based contour coding method as claimed in claim 1, wherein in an array of said utmost contour sample data, a difference value between upper and lower contours sampled at the left-most from an object is compared with that between upper and lower contours sampled at the right-most from the object, and said array is made starting from contour sample data having a larger difference value.

6. The baseline-based contour coding method as claimed in claim 5, wherein said utmost contour sample data is arrayed clockwise when said array is made from a left-most sample, and said utmost contour sample data is arrayed counter-clockwise when said array is made from a right-most sample.

7. A baseline-based contour decoding method for decoding data encoded by the method of claim 1, said method comprising the steps of:

receiving the encoded data and reconstructing utmost contour sample data and error sample data from the received data;

subtracting said error sample data from said utmost contour sample data and reproducing reconstructed sample data including a quantization error; and decoding said reconstructed data using motion compensation and transformation.

8. The baseline-based contour decoding method as claimed in claim 7, wherein motion estimation for said utmost contour sample data is made by utilizing a position displacement having the smallest difference value within a predetermined range from a present position as motion information with reference to utmost contour sample data previously reproduced in predetermined-sized block units.

9. The baseline-based contour decoding method as claimed in claim 7, wherein in motion estimation for said error sample data, the most similar error data among previously-reproduced error data is selected, and position displacement having the smallest difference value within a predetermined range from the selected error data is utilized as motion information.

10. A baseline-based contour encoder comprising:

a contour sampler for baseline-based sampling contour data from a still or moving image object, and extracting utmost contour sample data and error sample data of the object;

a motion estimator for dividing said contour sample data into predetermined-sized blocks and estimating motions with reference to previous contour data with respect to each block;

a coder for quantizing difference data obtained from sample data from said contour sampler and motion-compensated data, and coding the quantized data; and a contour reconstructor for producing previous contour data by de-quantizing said quantized data and compensating motions according to previous contour data and motion values.

11. A baseline-based contour encoder as claimed in claim 10, wherein said sampler decides a baseline of an object and a predetermined sampling interval, extracts contour sample data by sampling the contour of the object according to said baseline and said sampling interval, extracting utmost contour sample data of the object from said contour sample data, and extracts error sample data by calculating a difference between said utmost contour sample data and said contour sample data.

12. A baseline-based contour coding method comprising the steps of:

deciding a baseline of a still or moving image object and a predetermined sampling interval;

deciding the position of a sample far-most away from said baseline as a first sample point, deciding sample points according to the priority order having considered a traveling direction, and sampling the contour of the object at said sampling interval;

determining whether the point to be sampled in said sampling step corresponds to a turning point in the shape of the object;

sampling a coordinate value corresponding to the turning point twice, and extracting position data of the turning point, when said sampled point is a turning point in said turning point determining step; and extracting data of a distance between said baseline and said corresponding sampled point, when said sampled point is not a turning point in said turning point determining step.

13. A baseline-based contour decoding method for decoding data encoded by the method of claim 12, said method comprising the steps of:

receiving the encoded data and decoding distance data and turning point data from the received data;

determining whether sample data corresponds to a turning point;

changing the direction of reconstructing in opposition and reconstructing a contour according to said turning point data when it is determined in said determining step that said sample data is a turning point, otherwise, reconstructing a contour according to said distance data; and decoding said reconstructed data using motion compensation and transformation.

14. A baseline-based contour encoder comprising:

a contour sampler for baseline-based sampling contour data from a still or moving image object, and extracting position data or distance data according to whether sample data corresponds to a turning point or not;

a motion estimator for dividing said contour sample data into predetermined-sized blocks and estimating motions with reference to previous contour data with respect to each block;

a coder for quantizing difference data obtained from sample data from said contour sampler and motion-compensated data, and coding the quantized data; and a contour reconstructor for producing previous contour data by de-quantizing said quantized data and compensating motions according to previous contour data and motion values.

15. A baseline-based contour encoder as claimed in claim 14, wherein said sampler decides a baseline of the object and a predetermined sampling interval, decides a sample point depending on a distance from said baseline and the priority order, determines whether the sample point corresponds to a turning point in the shape of the object, and repeats twice a coordinate value and extracts position data when said sample point corresponds to a turning point, otherwise, extracts distance data.

* * * * *